United States Patent
Kim et al.

(10) Patent No.: US 6,947,722 B2
(45) Date of Patent: Sep. 20, 2005

(54) TUNER BLOCK FOR USE IN VIDEO SIGNAL RECEIVING APPARATUS HAVING MODULATOR, TUNER AND IF/DEMODULATOR CIRCUIT

(75) Inventors: Chul-min Kim, Suwon (KR); Seung-bong Yoo, Suwon (KR); Yong-bum Suh, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 642 days.

(21) Appl. No.: 10/045,043

(22) Filed: Jan. 15, 2002

(65) Prior Publication Data

US 2003/0068992 A1 Apr. 10, 2003

(30) Foreign Application Priority Data

Oct. 10, 2001  (KR) .................................. 10-2001-62462

(51) Int. Cl.[7] .............................................. H04B 1/08
(52) U.S. Cl. ...................... 455/349; 455/130; 455/90.3; 334/85
(58) Field of Search .......................... 455/188.1, 349, 455/130, 347, 90.3, 90.2, 550.1, 575.1, 560.1, 131, 557, 301, 182.2, 180.3, 182.3, 191.1; 348/734, 552, 729, 731; 358/21 R, 903, 160; 386/83, 46; 334/1–3, 17, 47, 85, 82

(56) References Cited

U.S. PATENT DOCUMENTS

| | | | | |
|---|---|---|---|---|
| 4,509,210 A | * | 4/1985 | Kohn | 455/349 |
| 4,569,084 A | * | 2/1986 | Takahama | 455/131 |
| 4,691,378 A | * | 9/1987 | Kumamoto et al. | 455/301 |
| 5,355,532 A | * | 10/1994 | Kubo et al. | 455/301 |
| 5,457,817 A | * | 10/1995 | Nagai et al. | 455/180.3 |
| 5,475,876 A | * | 12/1995 | Terada et al. | 455/301 |
| 5,710,999 A | * | 1/1998 | Iwase et al. | 455/349 |
| 5,913,173 A | * | 6/1999 | Ohwaki et al. | 455/557 |
| 5,915,068 A | * | 6/1999 | Levine | 386/83 |
| 6,404,309 B1 | * | 6/2002 | Hall et al. | 334/85 |
| 6,483,554 B1 | * | 11/2002 | Kim | 348/731 |
| 2003/0063225 A1 | * | 4/2003 | Sasaki | 348/731 |

FOREIGN PATENT DOCUMENTS

| | | |
|---|---|---|
| CN | 2369420 | 3/2000 |
| EP | 484 051 A2 | 6/1992 |

* cited by examiner

Primary Examiner—Edward Urban
Assistant Examiner—Charles Chow
(74) Attorney, Agent, or Firm—Staas & Halsey LLP

(57) ABSTRACT

A tuner block in which a modulator and an IF/demodulator circuit are integrally formed. The tuner block has a casing for accommodating a tuner, the IF/demodulator circuit and the modulator, and sixteen pins consecutively disposed at an outside of the casing. A number of the pins is reduced as compared with a conventional tuner block by supplying an electrical power to the modulator and the tuner through a common pin, dispensing with pins carrying unnecessary signals and pins which carry no signal and rearranging other pins. Potential for noise and interference between signals is reduced by maximizing displacements of connector pins which carry signals which are likely to interact. A switching arrangement provides for utilizing either a conventional tuner block or a tuner block according to the present invention on a circuit board.

19 Claims, 7 Drawing Sheets

TUNER BLOCK FOR USE IN VIDEO SIGNAL RECEIVING APPARATUS HAVING MODULATOR, TUNER AND IF/ DEMODULATOR CIRCUIT

CROSS REFERENCE TO RELATED APPLICATIONS

This application claims the benefit of Korean Application No. 2001-62462 filed Oct. 10, 2001, in the Korean Patent Office, the disclosure of which is incorporated herein by reference.

BACKGROUND OF THE INVENTION

1. Field of the Invention

The present invention relates to a tuner block for a broadcasting signal receiving apparatus such as a VCR, and more particularly, to a tuner block having a modulator, a tuner and IF/demodulator circuit which are built integrally in a casing.

2. Description of the Related Art

As shown in FIG. 1, a broadcasting signal receiving apparatus such as a VCR comprises an A/V block 10 for processing a video signal and an audio signal, a deck 20 for recording/reproducing the video signal and the audio signal on/from a recording medium such as a magnetic tape, a tuner block 50 for demodulating the video signal and the audio signal from the broadcasting signal transmitted through an antenna 60, and a CPU 30 which controls the broadcasting signal receiving apparatus. The tuner block 50 has a tuner 53 for tuning the broadcasting signal, an IF/demodulator circuit 55 for demodulating the tuned broadcasting signal, and a modulator 51 for modulating the video signal and the audio signal into an RF signal for a TV 70.

Generally, the modulator 51, the tuner 53, and the IF/demodulator circuit 55 are integrally built in a casing, and such a device is called as an integral-type of tuner block. The tuner block 50 is mounted on a printed circuit board in the VCR. The tuner block 50 is connected with other devices such as the A/V block 10 and the CPU 30 mounted on the printed circuit board.

FIG. 2 is a view showing an appearance of the conventional tuner block 50 that has the modulator 51, the tuner 53 and the IF/demodulator circuit 55 integrally formed therein. FIG. 3 is a view showing a layout of an arrangement of a plurality of pins of the tuner block 50 shown in FIG. 2.

As shown in FIG. 2, the tuner block 50 has a casing 50c for embracing the modulator 51, the tuner 53, and the IF/demodulator circuit 55, and an antenna input terminal 50a and an antenna output terminal 50b disposed at an outside of the casing 50c. The antenna input terminal 50a is connected with the antenna 60, and the antenna output terminal 50b is connected with the TV 70. A length of the casing 50c is standardized as 85 mm considering the arrangement of the plurality of pins installed on the casing 50c.

As shown in FIG. 3, twenty-two pins are installed in the casing 50c. The 22 pins consist of five pins (pin 1 through pin 5) corresponding to the modulator 51, twelve pins (pin 6 through pin 16 and pin 21) corresponding to the tuner 53, and five pins (pin 17 through pin 20 and pin 22) corresponding to the IF/demodulator circuit 55.

The five pins allocated to the modulator 51 comprise pin 1 and pin 5 (AUDIO IN, VIDEO IN) to input the audio signal and the video signal, respectively, pin 2 (CH/SW) to input a channel selection signal, pin 3 (MB (5V)) to supply electrical power needed for the modulator 51, and pin 4 (CONTROL) to input a control signal for a mode conversion between a TV mode and a VCR mode.

The twelve pins allocated to the tuner 53 comprise pin 6 (RF AGC) to control a gain of an input signal, pin 9 and pin 10 (SCL, SDA) connected with control buses to communicate with the CPU 30 through $I^2C$ communication, pin 13 (X-TAL IN) to input a clock signal, etc. Among the twelve pins allocated to the tuner 53, pin 7, pin 11, and pin 15 are not used.

The five pins allocated to the IF/demodulator circuit 55 comprise pin 19 and pin 22 (AUDIO OUT, VIDEO OUT) to output an audio signal and a video signal, respectively, pin 20 (SIF OUT) to output a sound sub-carrier, etc. Among these pins allocated to the IF/demodulator circuit 55, pin 17 and pin 18 are not used.

Such an arrangement of the pins is determined considering the position of three ICs (Integrated Circuits) corresponding to the modulator 51, the tuner 53, and the IF/demodulator circuit 55 disposed in the casing 50c. In other words, the ICs, which correspond to the modulator 51, the tuner 53, and IF/demodulator circuit 55, are consecutively disposed from an adjacent place to the antenna input terminal 50a and the antenna output terminal 50b in the casing 50c. Considering the position of the ICs, the pins used by the modulator 51 are disposed near to the antenna input terminal 50a and the antenna output terminal 50b, the pins used by the tuner 53 are disposed at a next position, and the pins used by the IF/demodulator circuit 55 are disposed at a farthest place from the antenna input terminal 50a and the antenna output terminal 50b.

Moreover, the arrangement of the pins is determined considering a necessity of maintaining a distance between pins which conduct signals that may cause interference if the pins are disposed closely to each other. For example, where the video output pin and the audio output pin are closely disposed, the video output signal causes interference to the audio output signal, thus noise is added to the audio signal. Therefore, the video output pin and the audio output pin are disposed respectively at pin 22 and pin 19 so as to be spaced by more than a predetermined distance.

However, a size of the conventional tuner block 50 becomes unnecessarily large since more pins are disposed than the number of pins actually needed for the broadcasting signal receiving apparatus. In other words, as described above, pins 7, 11, 15, 17, and 18 are not necessary since these pins are not used. Yet, the conventional tuner block 50 has the pins that are not used, thus the size of the tuner block 50 becomes unnecessarily large. Thus, it is difficult to realize a compact broadcasting signal receiving apparatus because of the unnecessarily large tuner block 50.

Recently, an IC having an integrally formed tuner and IF/demodulator circuit has been developed. Therefore, a tuner block having simpler construction may be manufactured by installing two ICs (a modulator IC and the integrated tuner and IF/demodulator circuit IC) in the casing. Accordingly, a small-sized tuner block may be created.

However, the arrangement of the pins according to the position of the modulator IC and the integrated tuner and the IF/demodulator circuit IC in the casing 50c, and signal interference problem between the pins in accordance with the position of the pins should be considered, even in the case of manufacturing the tuner block by adopting the IC in which the tuner and the IF/demodulator circuit are integrally formed. Therefore, to move some of the used pins to the position of the unused pins (pin 7, 11, 15, 17, 18) to reduce the number of the pins complicates construction of a circuit that connects the modulator IC and the integrated tuner and IF/demodulator circuit IC in the casing 50c and increases a probability that noise caused by the signal interference will be generated.

SUMMARY OF THE INVENTION

The present invention has been made to overcome the above-mentioned problems of the related art. Accordingly, it is a first object of the present invention to provide a small sized tuner block comprising an integrally formed modulator and IF/demodulator circuit, wherein some pins of the small sized tuner block have the same function as pins in a conventional tuner block.

A second object of the present invention is to provide a tuner block comprising an integrally formed modulator and IF/demodulator circuit, which realizes a compact casing and simplifies circuit construction in the casing, by determining positions of the pins in consideration of a position of a modulator IC and an integrated tuner and IF/demodulator circuit IC disposed in the casing.

A third object of the present invention is to provide a tuner block comprising an integrally formed modulator and IF/demodulator circuit, which creates a compact casing and minimizes the generation of a noise and interference between signals due to the compact casing.

Additional objects and advantages of the invention will be set forth in part in the description which follows, and, in part, will be obvious from the description, or may be learned by practice of the invention.

To accomplish the first object and other objects of the invention, the present invention comprises: a tuner which tunes a broadcast signal, an IF/demodulator circuit which demodulates the broadcast signal, a modulator which modulates a video signal and an audio signal into an RF signal, a casing which accommodates the tuner, the IF/demodulator circuit and the modulator, and a plurality of pins, disposed consecutively on an outside of the casing, which input and output signals and a voltage to operate the tuner, the IF/demodulator circuit and the modulator.

Here, one of the plurality of pins is a power supply pin through which an electrical power is supplied from an outside power supply. The tuner and the modulator are commonly connected to the power supply pin at an inside of the casing, whereby the tuner and the modulator are supplied with the electrical power required for a normal operation thereof through the power supply pin. Since the modulator and the tuner are supplied from a common pin, the number of the pins is reduced and a tuner block may be manufactured which is smaller in size compared with the conventional tuner block.

As shown in FIG. 5, a total number of pins is sixteen. Among the sixteen pins, a first pin through a fifth pin are used by the modulator, a sixth pin through an eleventh pin and a fourteenth pin are used by the tuner, and a twelfth, a thirteenth pin and a sixteenth pin are used by the IF/demodulator circuit. In addition, a fifteenth pin is a reserved pin, which is not used. The reserved pin may be removed, reducing the total number of the pins to fifteen.

The third pin is a power supply pin, and the seventh pin is a clock input pin to input a clock signal for use in the modulator and the tuner.

The tuner block to accomplish the second and the third object comprises: an audio output pin which outputs an audio signal demodulated by the IF/demodulator circuit; a video output pin distanced from the audio output pin at least by an interval as much as four of the pins, a video output pin which outputs the video signal demodulated by the IF/demodulator circuit; an SIF output pin disposed adjacent the audio output pin, the SIF output pin outputting a sound sub-carrier; and a clock input pin distanced from the SIF output pin at least by another interval as much as six of the pins, the clock input pin inputting a clock signal for use in the modulator and the tuner.

Preferably, the SIF output pin is disposed between the audio output pin and the video output pin. Accordingly, the SIF pin and the clock input pin are disposed for more than the distance of six pins as described above.

A TU-V pin which outputs a reference voltage used for a local oscillation of a frequency required by a selected channel and a reserved pin, which is not used, are disposed between the SIF output pin and the video output pin.

The total number of pins is sixteen. The audio output pin, the SIF output pin, the TU-V pin, the reserved pin and the video output pin are respectively a twelfth pin through a sixteenth pin among the sixteen pins, and the clock input pin is a seventh pin.

The first pin through the fifth pin are used by the modulator. The pins are respectively: an audio input pin which inputs the audio signal transmitted from an audio/video block; a channel selection pin which inputs a channel selection signal which selects an output channel of the modulator; a power supply pin which supplies an electrical power to the modulator and the tuner; a control pin which inputs a control signal for a mode conversion between a TV mode and a VCR mode; and a video input pin which inputs the video signal transmitted from the audio/video block.

A sixth pin and an eighth pin through an eleventh pin are used by the tuner. The pins are respectively: an automatic gain control pin which controls a gain of the broadcasting signal tuned by the tuner; an AS pin which inputs a signal which selects the tuner to be controlled; an SCL pin which inputs another clock signal used for a communication with respect to a CPU, an SDA pin which inputs a command transmitted from the CPU; and an AFT pin which outputs another reference voltage provided to the CPU, the another reference voltage being used for an automatic fine tuning.

Accordingly, the pins are disposed to correspond to the position of the modulator IC and the integrated tuner and IF/demodulator IC installed in the casing. Therefore, the compact tuner block may be realized and at the same time, a circuit construction in the casing is simplified. Furthermore, interference between the signals and the noise is minimized in the compact tuner block.

According to the present invention, the number of the pins is reduced to sixteen and a small-sized tuner block is realized.

BRIEF DESCRIPTION OF THE DRAWINGS

The above-mentioned objects and the feature of the present invention will be more apparent by describing an embodiment of the present invention by referring to the appended drawings, in which.

DESCRIPTION OF THE PREFERRED EMBODIMENT

Figure 1:
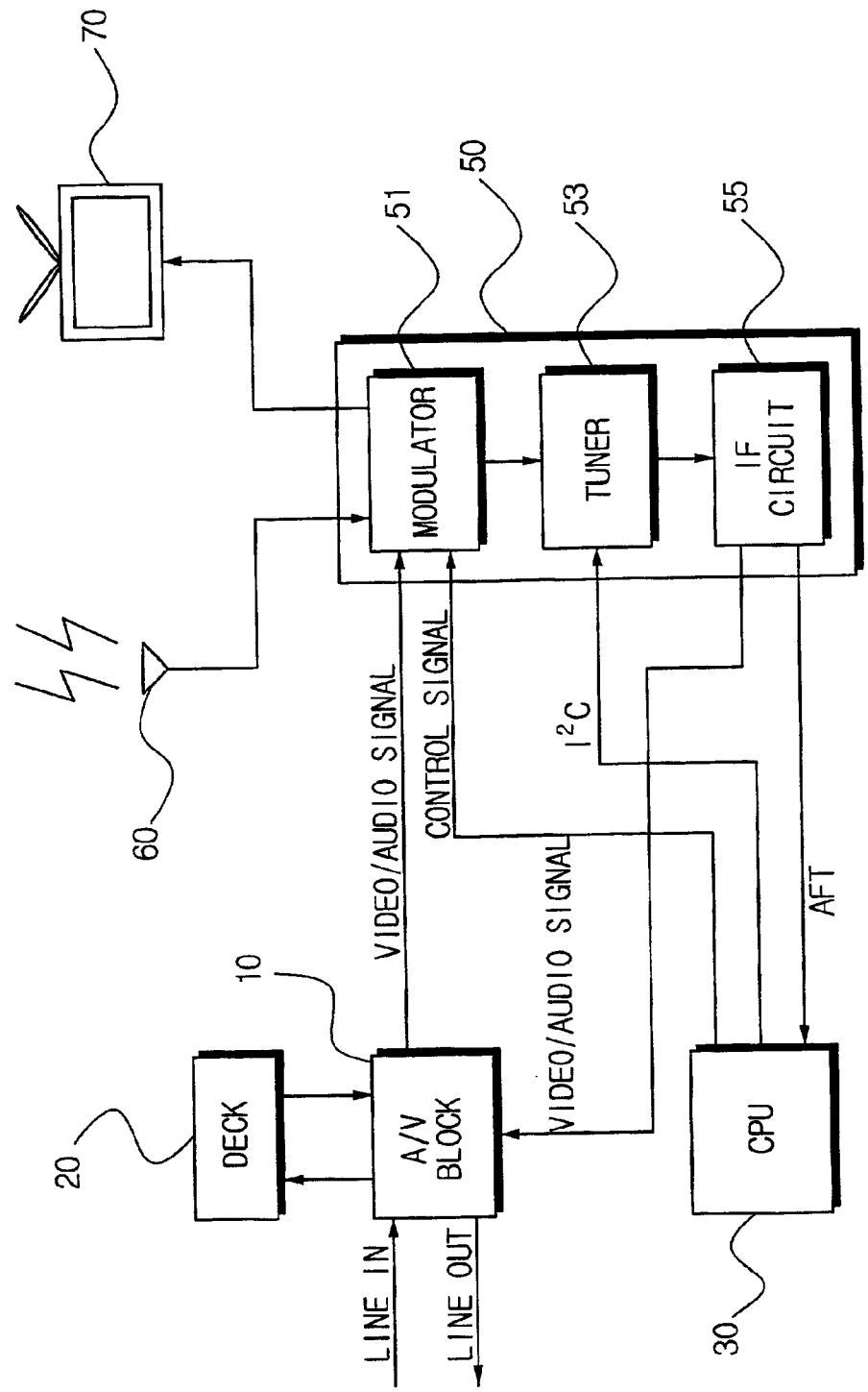
FIG. 1 is a schematic block diagram showing a conventional broadcasting signal receiving apparatus.

Reference will now be made in detail to the present embodiments of the present invention, examples of which are illustrated in the accompanying drawings, wherein like reference numerals refer to like elements throughout.

Figure 4:
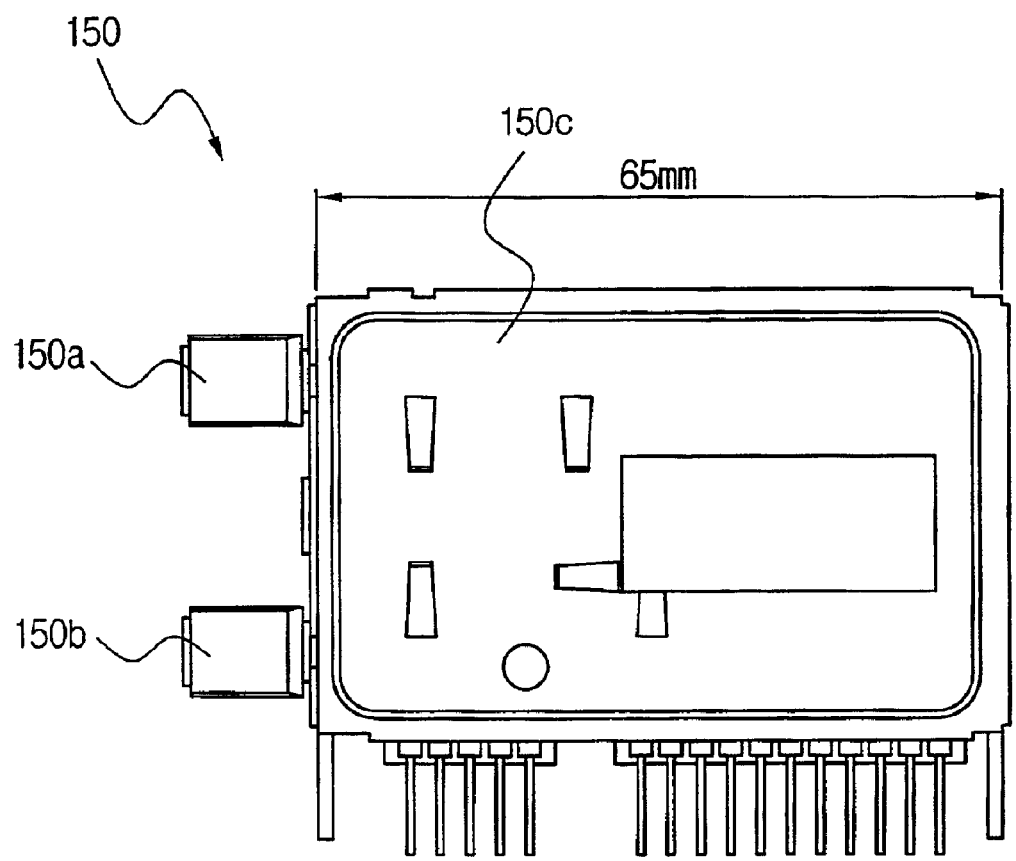
FIG. 4 is a view showing an appearance of the tuner block having an integrated modulator and an IF/demodulator circuit according to the present invention.

FIG. 4 is a view showing the appearance of a tuner block comprising a modulator and an IF/demodulator circuit according to the present invention. The tuner block 150 comprises a modulator, a tuner, an IF/demodulator circuit and a casing 150c which accommodates the modulator, the tuner, and the IF/demodulator circuit. An antenna input terminal 150a and an antenna output terminal 150b are installed at an outside of the casing 150c. A modulator IC is disposed at an adjacent position to the antenna input terminal 150a and the antenna output terminal 150b in the casing 150c. An integrated tuner and IF/demodulator circuit IC is disposed at a distant place from the position of the modulator IC.

Figure 2:
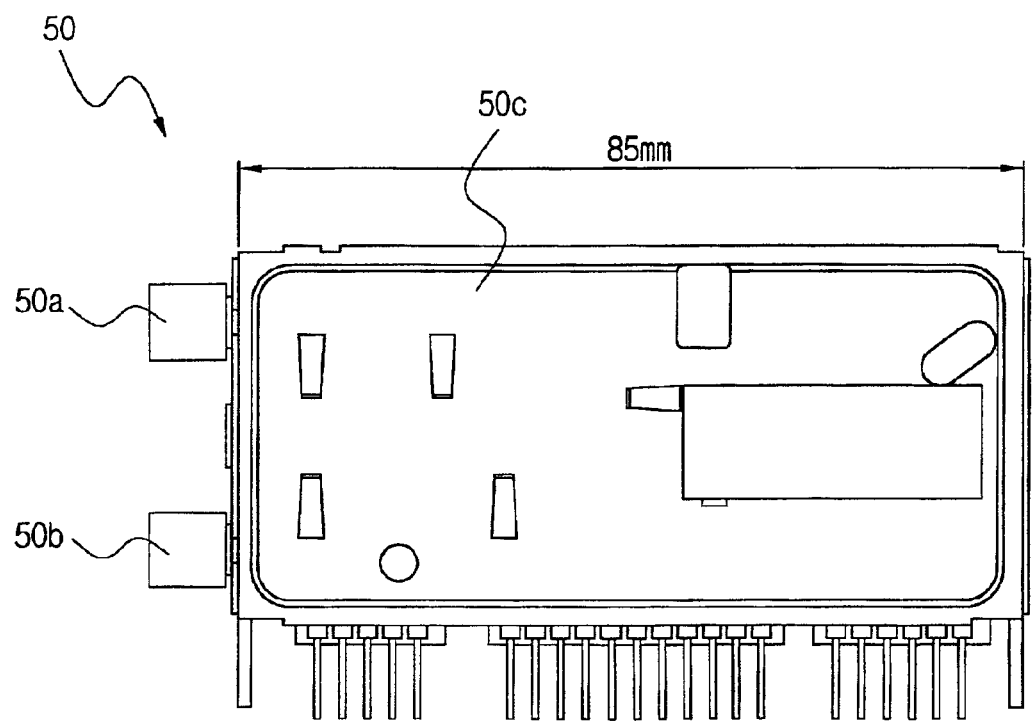
FIG. 2 is a view showing an appearance of the tuner block having an integrated modulator and an IF/demodulator circuit of FIG. 1.

Sixteen pins are disposed at a side of the casing 150c. The physical construction of each of the sixteen pins, such as size and shape of a pin, are the same as a pin of the conventional tuner block 50 in FIG. 2 and a distance between pins is the same as a distance between pins of the conventional tuner block 50. The casing 150c is formed to have a length of 60 to 65 mm, which is smaller than the conventional tuner block 50, since the number of the pins is reduced compared to the conventional tuner block 50. Preferably, the tuner block 150 according to the present invention has the length of 65 mm as shown in FIG. 4.

Figure 5:
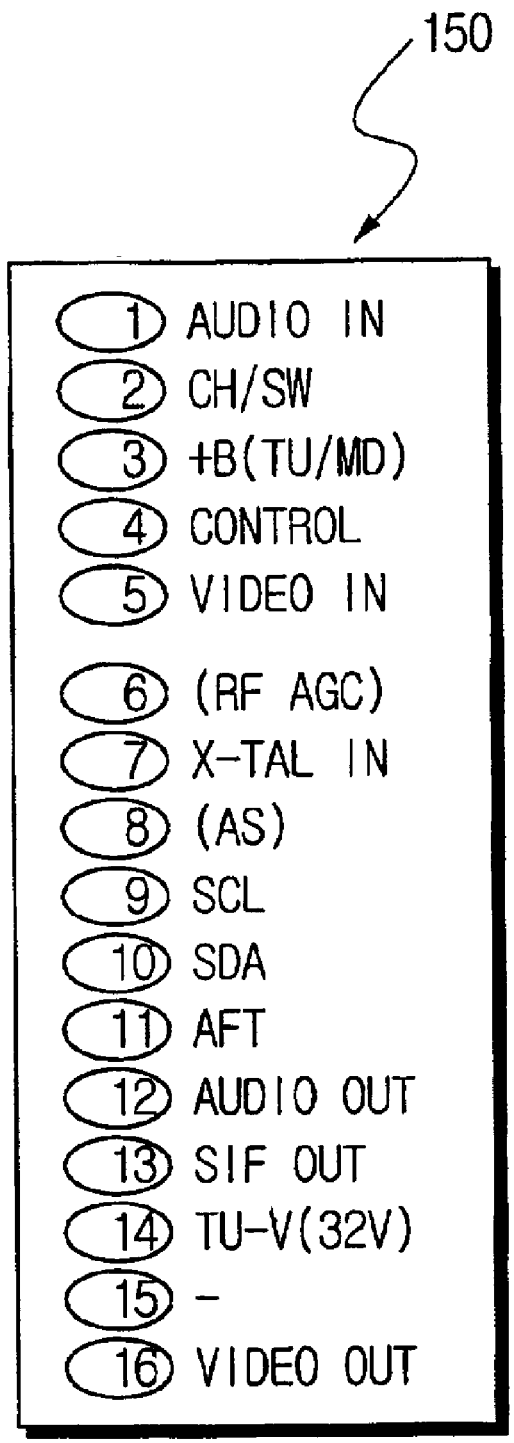
FIG. 5 is a view showing a layout of pins of the tuner block in FIG. 4.

FIG. 5 is a view showing a layout of pins used in the tuner block 150 of FIG. 4. Pin 1 and pin 5 (AUDIO IN, VIDEO IN) input an audio signal and a video signal, respectively, transmitted from an audio/video block. Pin 2 (CH/SW) inputs a channel selection signal (to select one channel between channel 3 and channel 4) which selects an output channel of the modulator. Pin 4 inputs a control signal which converts between a TV mode and a VCR mode.

Pin 3 (+B (TU/MD)) supplies electrical power to the modulator and the tuner. Thus, pin 1 through pin 5 are all used by the modulator. Among these pins, pin 3 is used for supplying the electrical power not only to the modulator but also to the tuner. To allow pin 3 to supply the electrical power to both the modulator and the tuner, electrical power supply reeds of the modulator IC and the integrated tuner and IF/demodulator circuit IC are commonly connected with pin 3 in the casing 150c.

Pin 6 (RF AGC) inputs a bias voltage to control a gain of the broadcasting signal tuned by the tuner. Pin 7 (X-TAL IN) inputs a clock signal for use in the modulator and the tuner. Pin 8 (AS) inputs a signal for appointing an address of a tuner to be controlled where there is a plurality of tuners. Pin 9 (SCL) inputs another clock signal used for communication with respect to a CPU through an I²C communication. Pin 10 (SDA) inputs a command transmitted from the CPU through the I²C communication. Pin 11 (AFT) outputs a reference voltage, which is provided to the CPU for an automatic fine tuning. Pin 12 (AUDIO OUT) outputs the audio signal. Pin 13 (SIF OUT) outputs a sound sub-carrier (4.5 MHz in the case of an NTSC method). Pin 14 (TU-V) outputs another reference voltage used for local oscillation of a frequency required by a selected channel. Pin 15 is a reserved pin, which is not used. Pin 16 (VIDEO OUT) outputs the video signal.

According to the above construction of the pins, pins 1 through 5 are used by the modulator, and pins 6 through 11 and 14 are used by the tuner. Pins 12, 13 and 16 are used by the IF/demodulator circuit 55, and pin 15 is not used. Pin 3 and pin 7 are used by both of the modulator and the tuner.

Figure 3:
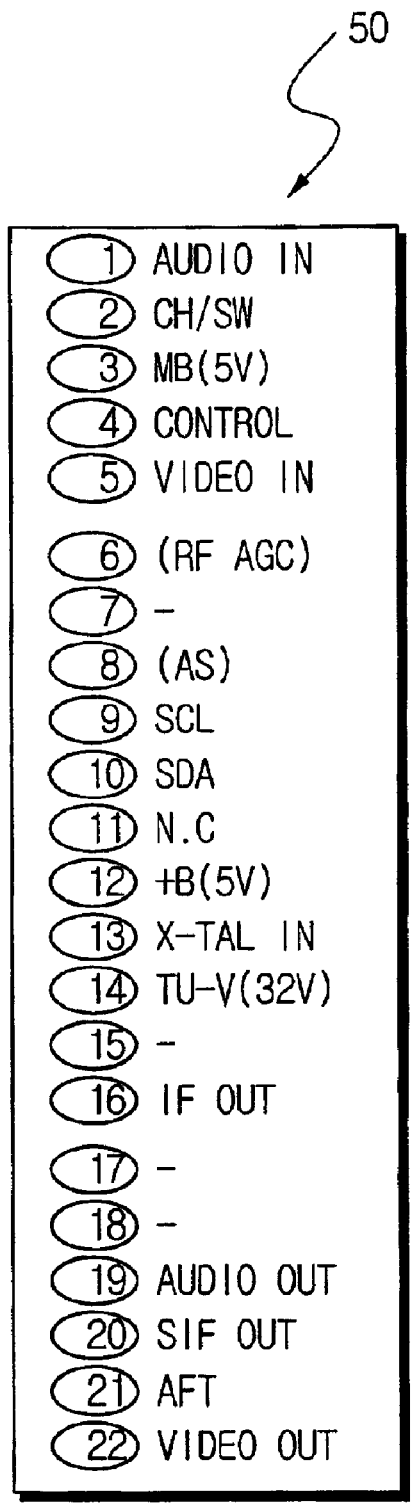
FIG. 3 is a view showing a layout of pins of the tuner block of FIG. 2.

According to the arrangement of the pins as described above, among pins allocated to the tuner 53 and the IF/demodulator circuit 55 in the conventional tuner block 50 of FIG. 3, six pins (pin 17 through 22) which are used in the conventional tuner block 50, are eliminated and functions of the eliminated pins are included among the sixteen pins of the tuner block 150. Actually, the IF/demodulator circuit 55 of the conventional tuner block 50 uses only four pins (pins 19 through 22), thus among pins (pin 1 through 16) allocated to the modulator 51 and the tuner 53 of the conventional tuner block 50, five pins are required to be reassigned to provide the interconnections previously provided by pins 19 through 22. Electrical power supply pin (pin 3) for the modulator and the electrical power supply pin (pin 12) for the tuner in the conventional tuner block 50 are integrated into pin 3 in the tuner block 150. Considering that the IF OUT pin (pin 16) in the conventional tuner block 50 is only used for testing, the IF OUT function has been removed and the VIDEO OUT function has been assigned to pin 16. Pin 15 is a reserved pin in both the conventional tuner block 50 and the tuner block 150. Where the reserved pin is also removed, the total number of the pins becomes fifteen.

In the tuner block 150 according to the present invention, the arrangement of several pins is different from the conventional tuner block 50 as will be described in great detail below.

The arrangement of pins 1 through 6, pins 8 through 10, and pin 14 is the same as the arrangement of pins 1 through 6, pins 8 through 10, and pin 14 of the conventional tuner block 50. However, in the conventional tuner block 50, pin 3 is used for supplying the electrical power to the modulator, but in the tuner block 150 according to the present invention, pin 3 is used for supplying the electrical power to both the modulator and the tuner.

The clock input pin (X-TAL IN), which was pin 13 in the conventional tuner block 50, has been moved to pin 7, which was not used in the conventional tuner block 50.

The audio output pin (AUDIO OUT), which was pin 19 in the conventional tuner block 50, has been moved to pin 12, which was used in the conventional tuner block 50 as power input for the tuner. Pin 12 of the conventional tuner block 50, as described above, has been integrated with pin 3. The video output (VIDEO OUT), which was pin 22 in the conventional tuner block 50, has been moved to pin 16 which was used as IF OUT in the conventional tuner block 50. As described above, in the tuner block 150 of the present invention, the IF OUT function has been removed.

The sub sound carrier signal (SIF OUT), which was pin 20 in the conventional tuner block 50, has been moved to pin 13, which was used as the clock input signal (X-TAL IN) in the conventional tuner block 50. The AFT signal, which was pin 21 in the conventional tuner block 50, has been moved to pin 11, which was not used in the conventional tuner block 50.

According to the above construction, the electrical power needed for the tuner and the modulator is supplied through pin 3, some of the previously reserved pins are used, the IF OUT function is eliminated, the number of the pins is reduced from 22 to 16, and one reserved pin is retained.

Since the audio output pin (AUDIO OUT) and the video output pin (VIDEO OUT) are respectively disposed at pin 12 and pin 16, the pins 12 and 16 are disposed to have an interval of four pins. Where the video output and the audio output are output from pins adjacent to each other, the video output becomes a noise source to the audio output. According to the present invention, the distance between the video output pin (VIDEO OUT) and the audio output pin (AUDIO OUT) becomes farther by one pin interval in comparison with that in the conventional tuner block 50. Therefore, the influence of the video output signal on the audio output signal becomes less, and the audio signal will have a better quality.

In addition, according to the present invention, the audio output pin (AUDIO OUT) and the SIF OUT pin are adjacently disposed. The signals output from the audio output pin (AUDIO OUT) and the SIF OUT pin are input to an AN block. Generally, there are two types of the AN block: one is a mono model, and the other is a hi-fi model having a hi-fi (Hi-Fi: High Fidelity) IC. The hi-fi IC generates a final audio signal after a predetermined signal processing in regard to the output signal of the SIF OUT pin, and passes through the output signal of the AUDIO OUT pin. Therefore, in the case of hi-fi model having the hi-fi IC, the audio output signal and the output signal of the SIF OUT pin are input to the AN block. For this end, it is preferable that the audio output pin (AUDIO OUT) and the SIF OUT pin are adjacently disposed. Accordingly, a circuit construction on a printed circuit board, in which the tuner block 150 and the AN block are mounted, becomes simpler.

Since the SIF OUT pin and the clock input pin (X-TAL IN) are respectively disposed at pin 13 and pin 7, the two pins are disposed to have an interval of six pins. Since the clock signal (X-TAL IN) and the sound sub-carrier (SIF OUT) are high frequency signals, where the SIF OUT pin and the clock input pin (X-TAL IN) are adjacently disposed to each other, the clock signal and the sound sub-carrier badly influence each other. Therefore, the SIF OUT pin and the clock input pin (X-TAL IN) are preferably disposed as far from each other as possible. According to the present invention, the position of the clock input pin (X-TAL IN) has been moved to pin 7, which is the farthest pin from the SIF OUT pin 13 among the pins (7, 11 and 15), which are not used in the conventional tuner block 50. Thus, although the SIF OUT pin and the clock input pin (X-TAL IN) are closer by 1 pin than in the conventional tuner block 50, an interval large enough to prevent interference from being generated between the pins has been maintained, and the number of the pins required to be moved in order to interconnect the tuner block 150 is minimized Furthermore, as described above, to maintain the interval between the SIF OUT pin and the clock input pin (X-TAL IN), and the interval between the audio output pin (AUDIO OUT) and the video output pin (VIDEO OUT), the SIF OUT pin is preferably disposed between the audio output pin (AUDIO OUT) and the video output pin (VIDEO OUT). In other words, in the present invention, the SIF OUT pin and the audio output pin (AUDIO OUT) are not disposed at pin 12 and pin 13, respectively, but are disposed at pin 13 and pin 12, respectively. According to the above arrangement, the audio output pin (AUDIO OUT) and the video output pin (VIDEO OUT) are disposed to have the interval of four pins as described above, thus the AUDIO OUT pin and the VIDEO OUT pin are 1 pin further apart than in the conventional tuner block 50. Moreover, according to the above arrangement, also the SIF OUT pin and the clock input pin (X-TAL IN) are disposed to have the interval of six pins.

An automatic fine tuning pin (AFT) is used by the tuner. Thus, it is preferable that the automatic fine tuning pin (AFT) is disposed with other pins (pin 6 through 10) which are also used by the tuner, thus, the AFT pin is disposed at pin 11.

Other pins excluding the pins moved as described above have been arranged as in the conventional tuner block 50 to minimize the change of the position of the pins compared with the conventional tuner block 50.

Figure 6A:
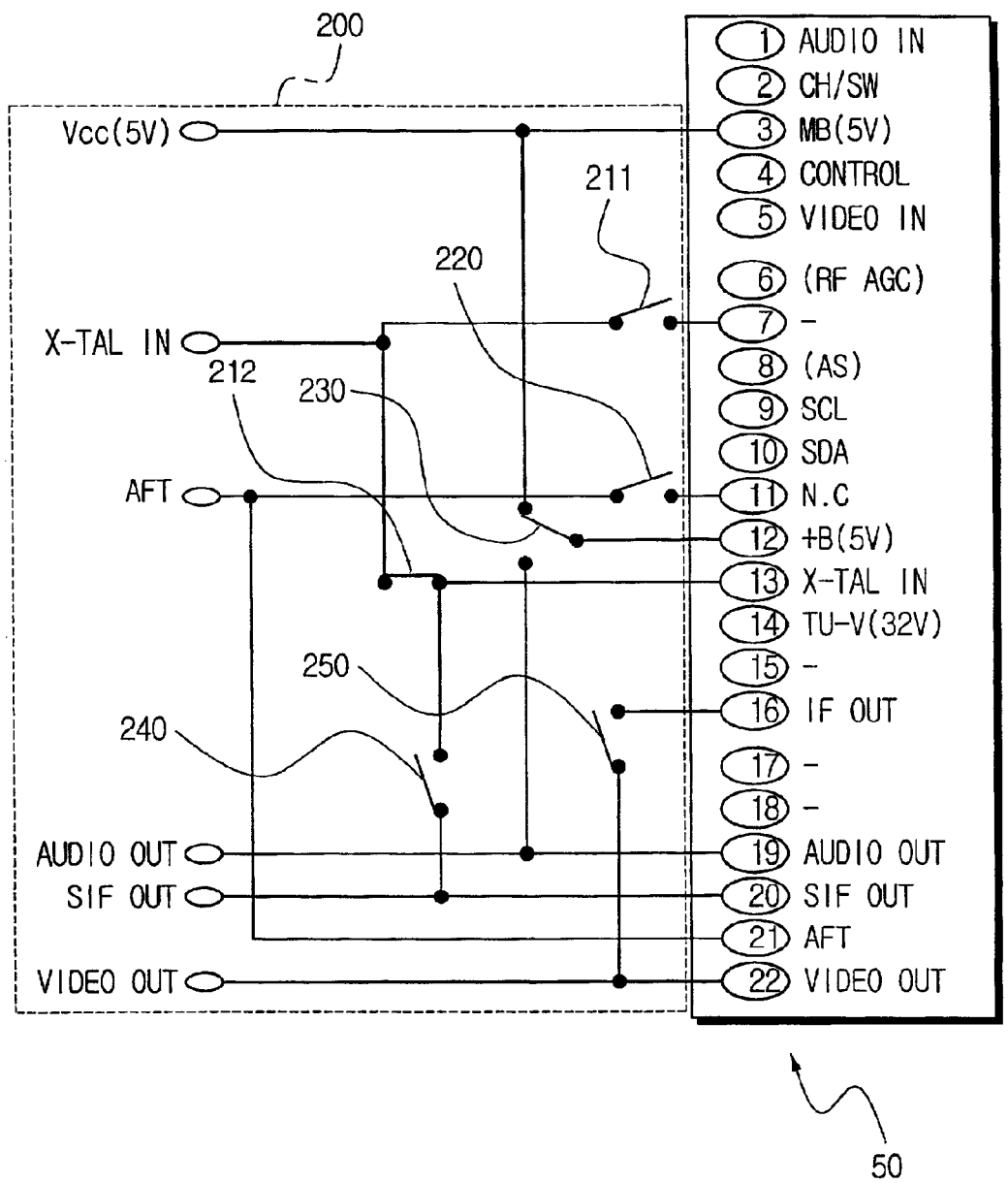
FIG. 6A is a view showing a switching status of a printed circuit board adapted to accommodate either the tuner block of FIG. 2 or the tuner block of FIG. 4 and showing a switching status for operation of the tuner block of FIG. 2.
Figure 6B:
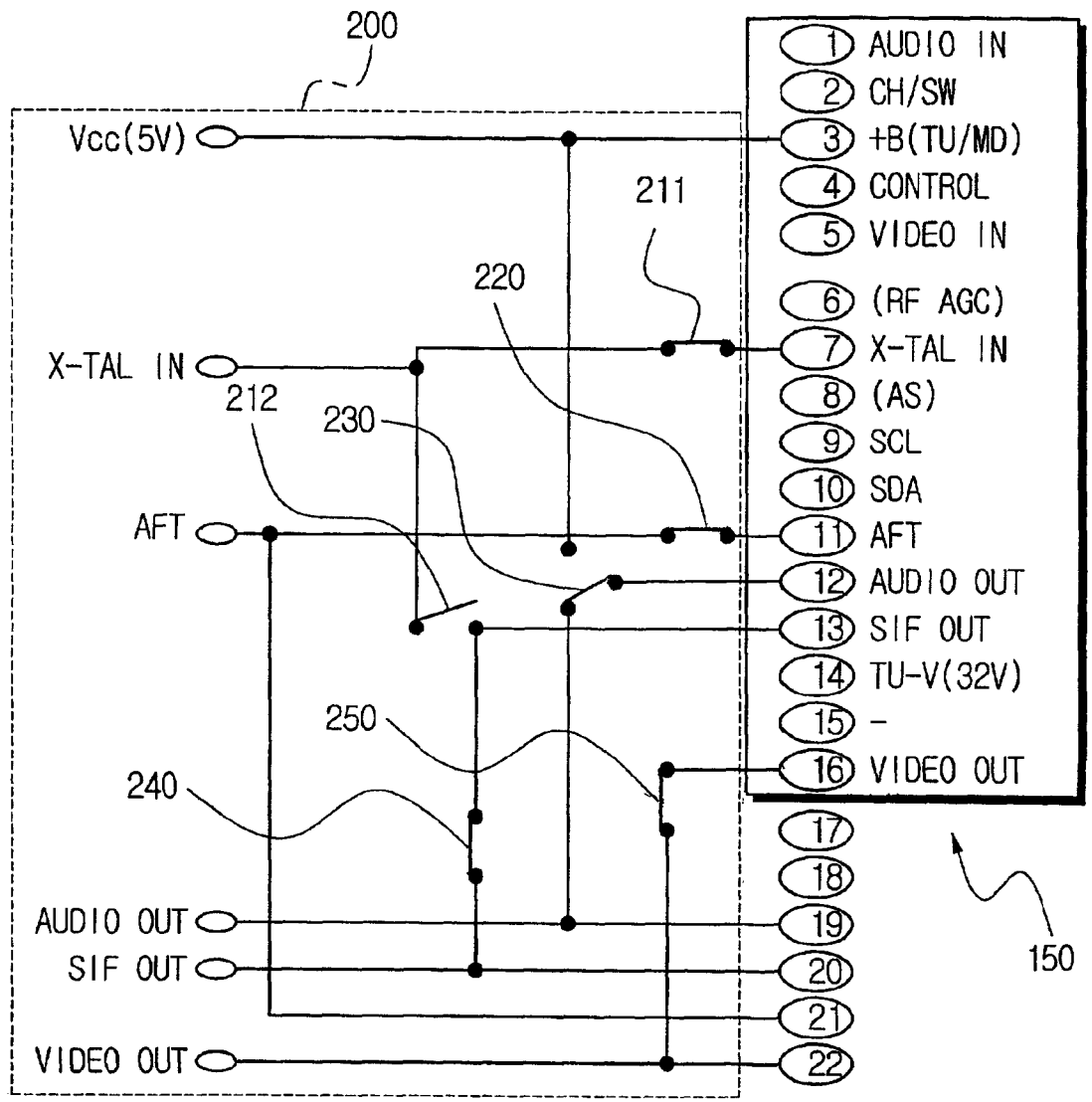
FIG. 6B is a view showing a switching status of the printed circuit board shown in FIG. 6A and showing a switching status for operation of the tuner block of FIG. 5.

FIGS. 6A and 6B show a switching circuit of the printed circuit board 200, on which the tuner block 150 in FIG. 5 is mounted. The switching circuit shown in FIGS. 6A and 6B, is manufactured to accommodate either the conventional tuner block 50 as shown in FIG. 6A, or the tuner block 150 according to the present invention as shown in FIG. 6B, on the printed circuit board 200.

As shown in FIGS. 6A and 6B, a clock signal input (X-TAL IN) line is connected with pin 7 and pin 13 through a first clock switch 211 and a second clock switch 212. Where the conventional tuner block 50 is mounted on the printed circuit board 200, the first clock switch 211 is off and the second clock switch 212 is on as shown in FIG. 6A. Where the tuner block 150 of the present invention is mounted on the printed circuit board 200, the first clock switch 211 is on and the second clock switch 212 is off as shown in FIG. 6B.

An ATF output line is connected with pin 21, and connected with pin 11 via an AFT switch 220. Where the conventional tuner block 50 is mounted on the printed circuit board 200, the AFT switch 220 is off as shown in FIG. 6A, and where the tuner block 150 according to the present invention is mounted on the printed circuit board 200, the AFT switch 220 is on as shown in FIG. 6B.

An SIF output line (SIF OUT) is connected with pin 20 and connected with pin 13 via an SIF switch 240. Where the conventional tuner block 50 is mounted on the printed circuit board 200, the SIF switch 240 is off as shown in FIG. 6A, and where the tuner block 150 according to the present invention is mounted on the printed circuit board 200, the SIF switch 240 is on as shown in FIG. 6B.

A video signal output line (VIDEO OUT) is connected with pin 22 and connected with pin 16 via a video switch 250. Where the conventional tuner block 50 is mounted on the printed circuit board 200, the video switch 250 is off as shown in FIG. 6A, and where the tuner block 150 according to the present invention is mounted on the printed circuit board 200, the video switch 250 is on as shown in FIG. 6B.

An electrical power supply line (Vcc 5V) is connected with pin 3, and an audio output (AUDIO OUT) line is connected with pin 19. The electrical power supply line (Vcc 5V) and the audio output (AUDIO OUT) line are connected with pin 12 through a conversion switch 230. Where the conventional tuner block 50 is mounted on the printed circuit board 200, the conversion switch 230 is switched to connect pin 12 with the electrical power (Vcc 5V) as shown in FIG. 6A, and where the tuner block 150 according to the present invention is mounted on the printed circuit board 200, the conversion switch 230 is switched to connect pin 12 with the audio output (AUDIO OUT) line as shown in FIG. 6B. Therefore, where the conventional tuner block 50 is mounted, the electrical power is supplied to the modulator through pin 12, and where the tuner block 150 according to the present invention is mounted, the audio signal output through pin 12 is transmitted to the ANV block.

Each of the switches 211, 212, 220, 230, 240 and 250 is realizable by using a jumper which determines an electrical connection status on the printed circuit board 200. In other words, by changing the installation position of the jumper installed on the printed circuit board 200, the electrical connection status between the parts mounted on the printed circuit board 200 is changed. Therefore, without changing the arrangement of holes which are formed on the printed circuit board 200 for mounting the tuner block, the electrical connection status of the printed circuit board 200 is changeable to be used with either the conventional tuner block 50 or the tuner block 150 according to the present invention.

One way of changing the electrical connection status is to change a jumper installation program of a chip mounting apparatus. Another way of changing the electrical connection status is to manufacture the printed circuit board 200 to include the switches 211, 212, 220, 230, 240 and 250, and allow the switching status to be changed in accordance with the mounted tuner block selected from one of the conventional tuner block 50 and the tuner block 150 according to the present invention. Consequently, the tuner block 150 may be used interchangeably with the conventional tuner block by appropriately setting the switches 211, 212, 220, 230, 240 and 250 as described above.

Since the electrical power for supplying the electrical power to the modulator and the tuner is provided by a common pin (pin 3) in the tuner block 150, the number of the pins is reduced, and a small-sized tuner block compared to the conventional tuner block may be manufactured.

Moreover, each pin of the tuner bock 150 is disposed to correspond to the position of the modulator IC and the integrated tuner and IF/demodulator circuit IC disposed in the casing, thus the tuner block is compact, and at the same time, the circuit construction in the casing is simplified. In addition, the noise and interference between the signals in the tuner block 150 is minimized.

Furthermore, by changing installation positions of jumpers in the printed circuit board, one of the conventional tuner block and the tuner block according to the present invention is selectively installable. Compared with the conventional tuner block 50, the number of the pins changed to result in the tuner block 150 is minimized, thus the number of jumpers which are changed in position is reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A tuner block comprising:
a tuner which tunes a broadcasting signal;
an IF/demodulator circuit which demodulates the broadcasting signal tuned by the tuner;
a modulator which modulates an input video signal and an input audio signal into an RF signal;
a single casing which accommodates the tuner, the IF/demodulator circuit and the modulator, wherein the tuner, IF/demodulator circuit and the modulator are integrally formed in the single casing minimizing noise and interference between signals input to and output from the single casing; and
a plurality of pins disposed consecutively on an outer side of the casing, the plurality of pins to input and/or output signals and a voltage to operate the tuner, the IF/demodulator circuit and the modulator;
wherein one of the plurality of pins is a power supply pin through which an electrical power is supplied from an outside power supply, and the tuner and the modulator are connected commonly to the power supply pin inside of the casing.

2. The tuner block according to claim 1, wherein, among the plurality of pins, a first pin through a fifth pin are used by the modulator, a sixth pin through an eleventh pin and a fourteenth pin are used by the tuner, and a twelfth pin, a thirteenth pin and a sixteenth pin are used by the IF/demodulator circuit.

3. The tuner block according to claim 2, wherein, among the plurality of pins, a fifteenth pin is a reserved pin which is not used.

4. The tuner block according to claim 3, wherein, among the plurality of pins, the third pin is the power supply pin.

5. The tuner block according to claim 4, wherein, among the plurality of pins, a seventh pin is a clock input pin which inputs a clock signal for use in the modulator and the tuner.

6. A tuner block comprising:
a tuner which tunes a broadcasting signal;
an IF/demodulator circuit which demodulates the broadcasting signal tuned by the tuner;
a modulator which modulates an input video signal and an input audio signal into an RF signal;
a casing which accommodates the tuner, the IF/demodulator circuit and the modulator; and
a plurality of pins disposed consecutively on an outer side of the casing, the plurality of pins to input and/or output signals and a voltage to operate the tuner, the IF/demodulator circuit and the modulator;
wherein one of the plurality of pins is a power supply pin through which an electrical power is supplied from an outside power supply, and the tuner and the modulator are connected commonly to the power supply pin inside of the casing, and
wherein, among the plurality of pins,
the first pin is an audio input pin which inputs an audio signal transmitted from an audio/video block,
the second pin is a channel selection pin which inputs a channel selection signal which selects an output channel of the modulator,
the fourth pin is a control pin which inputs a control signal to convert between a TV mode and a VCR mode, and
the fifth pin is a video input pin which inputs the input video signal.

7. The tuner block according to claim 6, wherein, among the plurality of pins,
the sixth pin is an automatic gain control pin which controls a gain of the broadcasting signal tuned by the tuner,
the eighth pin is an AS pin which inputs a signal to select one of the tuner and at least one other tuner,
the ninth pin is an SCL pin which inputs another clock signal used to communicate with a CPU,
the tenth pin is an SDA pin which inputs a command transmitted from the CPU, the eleventh pin is an AFT pin which outputs a reference voltage to the CPU, to enable an automatic fine tuning, and the fourteenth pin is a TU-V pin which outputs another reference voltage used to determine local oscillation of a frequency required by a selected channel.

8. The tuner block according to claim 7, wherein, among the plurality of pins, the twelfth pin is an audio output pin which outputs an audio signal demodulated by the IF/demodulator circuit, the thirteenth pin is an SIF output pin which outputs a sound sub-carrier, and the sixteenth pin is a video output pin which outputs a video signal demodulated by the IF/demodulator circuit.

9. A tuner block comprising:

a tuner which tunes a broadcasting signal;

an IF/demodulator circuit which demodulates the broadcasting signal tuned by the tuner;

a modulator which modulates an input video signal and an input audio signal into an RF signal;

a casing which accommodates the tuner, the IF/demodulator circuit and the modulator; and a plurality of pins disposed consecutively at intervals on an outer side of the casing, the plurality of pins to input and/or output signals and a voltage to operate the tuner, the IF/demodulator circuit and the modulator;

wherein the plurality of pins comprises, an audio output pin which outputs an audio signal demodulated by the IF/demodulator circuit, a video output pin which outputs a video signal demodulated by the IF/demodulator circuit, wherein the video output pin is distanced from the audio output pin by at least four pin intervals, an SIF output pin disposed adjacent to the audio output pin, the SIF output pin to output a sound sub-carrier, and a clock input pin distanced from the SIF output pin by at least six pin intervals, the clock input pin to input a clock signal to the modulator and the tuner.

10. The tuner block according to claim 9, wherein the SIF output pin is disposed between the audio output pin and the video output pin.

11. The tuner block according to claim 10, wherein:

a TU-V pin which outputs a reference voltage used to determine local oscillation of a frequency required by a selected channel, and a reserved pin which is not used, are disposed between the SIF output pin and the video output pin.

12. The tuner block according to claim 11, wherein:

a total number of the plurality of pins is sixteen, the audio output pin, the SIF output pin, the TU-V pin, the reserved pin and the video output pin are a twelfth pin through a sixteenth pin, respectively, among the sixteen pins, and the clock input pin is a seventh pin among the sixteen pins.

13. The tuner block according to claim 12, wherein;

among the sixteen pins, a first pin through a fifth pin are used by the modulator, and a sixth pin through an eighth pin and an eleventh pin are used by the tuner.

14. The tuner block according to claim 13, wherein:

the first pin through the fifth pin are, respectively, an audio input pin which inputs the input audio signal, a channel selection pin which inputs a channel selection signal to select an output channel of the modulator, a power supply pin which supplies electrical power to the modulator and the tuner, a control pin which inputs a control signal to convert between a TV mode and a VCR mode, and a video input pin which inputs the input video signal.

15. The tuner block according to claim 14, wherein, the sixth pin is an automatic gain control pin which controls a gain of the broadcasting signal tuned by the tuner, and the eighth pin through the eleventh pin are, respectively, an AS pin which inputs a signal to select one of the tuner and at least one other tuner, an SCL pin which inputs another clock signal used to communicate with a CPU, an SDA pin which inputs a command transmitted from the CPU, and an AFT pin which outputs another reference voltage to the CPU, to enable an automatic fine tuning.

16. The interface circuit according to claim 14, further comprising:

a third jumper which completes a fifth of the plurality of circuit paths to connect the third corresponding pin to a sound sub-carrier output to selectively use the second tuner block;

a fourth jumper which completes a sixth of the plurality of circuit paths to connect a fourth of the corresponding pins to an automatic fine tuning output to selectively use the second tuner block; and a fifth jumper which completes a seventh of the plurality of circuit paths to connect a video output to a fifth of the corresponding pins to selectively use the second tuner block.

17. A tuner block comprising:

a tuner which tunes a broadcasting signal;

an IF/demodulator circuit which demodulates the broadcasting signal tuned by the tuner;

a modulator which modulates an input video signal and an input audio signal into an RF signal; and sixteen pins disposed consecutively on an outer side of the casing, the pins to input and/or output signals and a voltage needed to operate the tuner, the IF circuit and the modulator; wherein:

a first pin inputs the input audio signal, a second pin inputs a channel selection signal to select an output channel of the modulator, a third pin inputs the voltage to the modulator and the tuner, a fourth pin inputs a control signal to convert between a TV mode and a VCR mode, a fifth pin inputs the input video signal;

a sixth pin inputs a signal to control a gain of the broadcasting signal tuned by the tuner, a seventh pin inputs a clock signal to the modulator and the tuner, an eighth pin inputs an AS signal to select one of the tuner and at least one other tuner, a ninth pin inputs another clock signal used to communicate with a CPU, a tenth pin inputs a command transmitted from the CPU, an eleventh pin outputs a reference voltage to the CPU, to enable automatic fine tuning, a twelfth pin outputs an output audio signal demodulated by the IF/demodulator circuit, a thirteenth pin outputs a sound sub-carrier, a fourteenth pin outputs another reference voltage to determine local oscillation of a frequency required by the selected channel, a fifteenth pin is a reserved pin which is not used, and a sixteenth pin outputs an output video signal demodulated by the IF/demodulator circuit.

18. An interface circuit for selectively using one of a first tuner block having a first predetermined number of connector pins and a second tuner block having a second predetermined number of connector pins, wherein a third predetermined number of corresponding pins of the first and second predetermined numbers of pins have different functional assignments, the interface circuit comprising:

a first switch which connects a first of the corresponding pins to a power supply input voltage to selectively use the first tuner block or connects the first corresponding pin to an audio output function to selectively use the second tuner block;

a second switch which disconnects a clock input signal from a second of the corresponding pins to selectively use the first tuner block and connects the clock input signal to the second corresponding pin to selectively use the second tuner block;

a third switch which connects the clock input signal to a third of the corresponding pins to selectively use the first tuner block and disconnects the clock input signal from the third corresponding pin to selectively use the second tuner block;

a fourth switch which connects the third corresponding pin to a sound sub-carrier output to selectively use the second tuner block and disconnects the third corresponding pin from the sound sub-carrier output to selective use the first tuner block;

a fifth switch which disconnects an automatic fine tuning output from a fourth of the corresponding pins to selectively use the first tuner block and connects the fourth corresponding pin to the automatic fine tuning output to selectively use the second tuner block; and a sixth switch which connects a video output to a fifth of the corresponding pins to selectively use the second tuner block and disconnects the fifth corresponding pin from the video output to selectively use the first tuner block.

19. An interface circuit for selectively using one of a first tuner block having a first predetermined number of connector pins and a second tuner block having a second predetermined number of connector pins, wherein a third predetermined number of corresponding pins of the first and second predetermined numbers of pins have different functional assignments, the interface circuit comprising:

a circuit board having a plurality of circuit paths, each circuit path connecting a respective pin of the third predetermined number of corresponding pins with additional circuitry, each of the plurality of circuits path having an opening in the circuit path adapted to receive a jumper;

a first jumper which completes a first of the plurality of circuit paths to connect a first of the corresponding pins to a power supply input to selectively use the first tuner block or completes a second of the plurality of circuit paths to connect the first corresponding pin to an audio output to selectively use the second tuner block; and a second jumper which completes a third of the plurality of circuit paths to connect a clock input to a second of the corresponding pins to selectively use the second tuner block or completes a fourth of the plurality of circuit paths to connect the clock input to a third of the corresponding pins to selectively use the first tuner block.

* * * * *

UNITED STATES PATENT AND TRADEMARK OFFICE
CERTIFICATE OF CORRECTION

| | | |
|---|---|---|
| PATENT NO. | : 6,947,722 B2 | Page 1 of 1 |
| APPLICATION NO. | : 10/045043 | |
| DATED | : September 20, 2005 | |
| INVENTOR(S) | : Chul-min Kim et al. | |

It is certified that error appears in the above-identified patent and that said Letters Patent is hereby corrected as shown below:

Title Page: Column 2, line 2, (Foreign Patent Documents), replace "6/1992" with --5/1992--, therefor;

Column 11, line 64, Claim 13, replace "wherein;" with --wherein:--, therefor;

Column 12, line 11, Claim 15, replace "wherein," with --wherein:--, therefor.

Signed and Sealed this

Fifteenth Day of August, 2006

JON W. DUDAS
*Director of the United States Patent and Trademark Office*